US012712267B2

(12) United States Patent
Hsieh et al.

(10) Patent No.: US 12,712,267 B2
(45) Date of Patent: Aug. 18, 2026

(54) ELECTRONIC DEVICE WITH DISPLAY-INTEGRATED ANTENNAS

(71) Applicant: Apple Inc., Cupertino, CA (US)

(72) Inventors: Cheng-Chih Hsieh, Santa Clara, CA (US); Abbas Jamshidi Roudbari, Saratoga, CA (US); Andrea Ruaro, San Jose, CA (US); Jayesh Nath, Santa Clara, CA (US); Ken Hsuan Liao, San Jose, CA (US); Mario Martinis, Cupertino, CA (US); Matthew H Fong, Sunnyvale, CA (US); Shih Chang Chang, Cupertino, CA (US); Shin-Hung Yeh, Taipei (TW); Ting-Kuo Chang, San Jose, CA (US); Tsung-Ting Tsai, San Jose, CA (US); Warren S Rieutort-Louis, Cupertino, CA (US); Wen-Chen Chen, Cupertino, CA (US); Po-Jui Chen, Cupertino, CA (US); Ying-Chih Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 30 days.

(21) Appl. No.: 18/655,770

(22) Filed: May 6, 2024

(65) Prior Publication Data

US 2025/0343354 A1 Nov. 6, 2025

(51) Int. Cl.

*H01Q 7/00* (2006.01)
*H01Q 1/27* (2006.01)
*G06F 1/16* (2006.01)

(52) U.S. Cl.

CPC ............... *H01Q 7/00* (2013.01); *H01Q 1/273* (2013.01); *G06F 1/163* (2013.01); *G06F 1/1633* (2013.01)

(58) Field of Classification Search

CPC ............... H01Q 7/00; H01Q 1/27; G06F 1/16
See application file for complete search history.

(56) References Cited

U.S. PATENT DOCUMENTS 9,356,661 B2 5/2016 Samardzija et al.
9,685,690 B2 6/2017 Samardzija et al.
10,461,395 B2 10/2019 Samardzija et al.
10,734,708 B2 8/2020 Yong et al.
10,895,634 B2 1/2021 Nath et al.
11,894,600 B2 2/2024 Samardzija et al.
2011/0210825 A1 9/2011 Murakami et al.

(Continued)

*Primary Examiner* — Thien M Le

(74) *Attorney, Agent, or Firm* — Treyz Law Group, P.C.; Michael H. Lyons

(57) ABSTRACT

An electronic device such as a wristwatch may be provided with a housing, a display mounted to the housing, and a near field antenna. The display may include a display panel. A central region of the display panel may emit images through the display cover layer. A peripheral region of the display panel does not emit images through the display cover layer. The near field antenna has a coil that overlaps the peripheral region of the display panel. The coil may laterally surround a central area overlapping the central region of the display panel. The coil may be interposed between the display panel and the display cover layer or may be integrated into the display panel. Integrating the near field antenna into the display in this way may allow the display to be implemented without any ferrite layers, which may reduce a thickness of the display.

20 Claims, 7 Drawing Sheets

(56) References Cited

U.S. PATENT DOCUMENTS

| | | | | |
|---|---|---|---|---|
| 2013/0078917 | A1 | 3/2013 | Cho et al. | |
| 2013/0229362 | A1 | 9/2013 | Liu et al. | |
| 2015/0061976 | A1* | 3/2015 | Ferri | G02B 27/0101 345/9 |
| 2015/0311960 | A1* | 10/2015 | Samardzija | H04B 5/26 455/90.3 |
| 2015/0351292 | A1* | 12/2015 | Chang | H01Q 1/526 343/866 |
| 2016/0056526 | A1* | 2/2016 | Li | H01Q 9/42 343/702 |
| 2018/0048057 | A1* | 2/2018 | Ehman | H01Q 7/00 |
| 2018/0048058 | A1* | 2/2018 | Ehman | H01Q 1/2291 |
| 2018/0062264 | A1* | 3/2018 | Martinis | H01Q 9/42 |
| 2018/0069588 | A1* | 3/2018 | Jiang | H04M 1/0202 |
| 2021/0143155 | A1* | 5/2021 | Huang | H10B 12/488 |
| 2023/0420868 | A1 | 12/2023 | Papantonis et al. | |

* cited by examiner

ELECTRONIC DEVICE WITH DISPLAY-INTEGRATED ANTENNAS

FIELD

This relates generally to electronic devices, including electronic devices with wireless communications capabilities.

BACKGROUND

Electronic devices are often provided with wireless communications capabilities. Electronic devices with wireless communications capabilities are often provided with wireless circuitry that includes antennas for conveying radio-frequency signals. To satisfy consumer demand for small form factor electronic devices, manufacturers are continually striving to implement wireless circuitry using compact structures.

It may be desirable for the wireless circuitry to include different antennas for handling different frequency bands and/or radio access technologies. However, because antennas have the potential to interfere with each other and with other components in an electronic device, care must be taken when incorporating antennas into an electronic device to ensure that the antennas are able to exhibit satisfactory performance over a range of operating frequencies and with satisfactory efficiency bandwidth, while still allowing the device to exhibit a compact form factor.

SUMMARY

An electronic device such as a wristwatch may be provided with a housing. The device may have a display mounted to the housing. The display may include a display panel mounted to a display cover layer. The display panel may include a thin film transistor (TFT) layer, an organic light emitting diode (OLED) layer, an encapsulation layer, and a touch sensor layer. A central region of the display panel may emit images through the display cover layer. A peripheral region of the display panel does not emit images through the display cover layer. An opaque masking layer may cover the peripheral region.

The device may be provided with wireless circuitry. The wireless circuitry may include a far field antenna and a near field antenna. The far field antenna may have an antenna resonating element. The antenna resonating element may include portions of the TFT layer, OLED layer, and touch sensor layer within the central region of the display panel. The near field antenna has a coil that overlaps the peripheral region of the display panel. The coil may laterally surround a central area overlapping the central region of the display panel and the antenna resonating element of the far field antenna. The coil may be interposed between the display panel and the display cover layer or may be integrated into the display panel. Integrating the near field antenna into the display in this way may allow the display to be implemented without any ferrite layers, which may reduce a thickness of the display.

DETAILED DESCRIPTION

Figure 1:
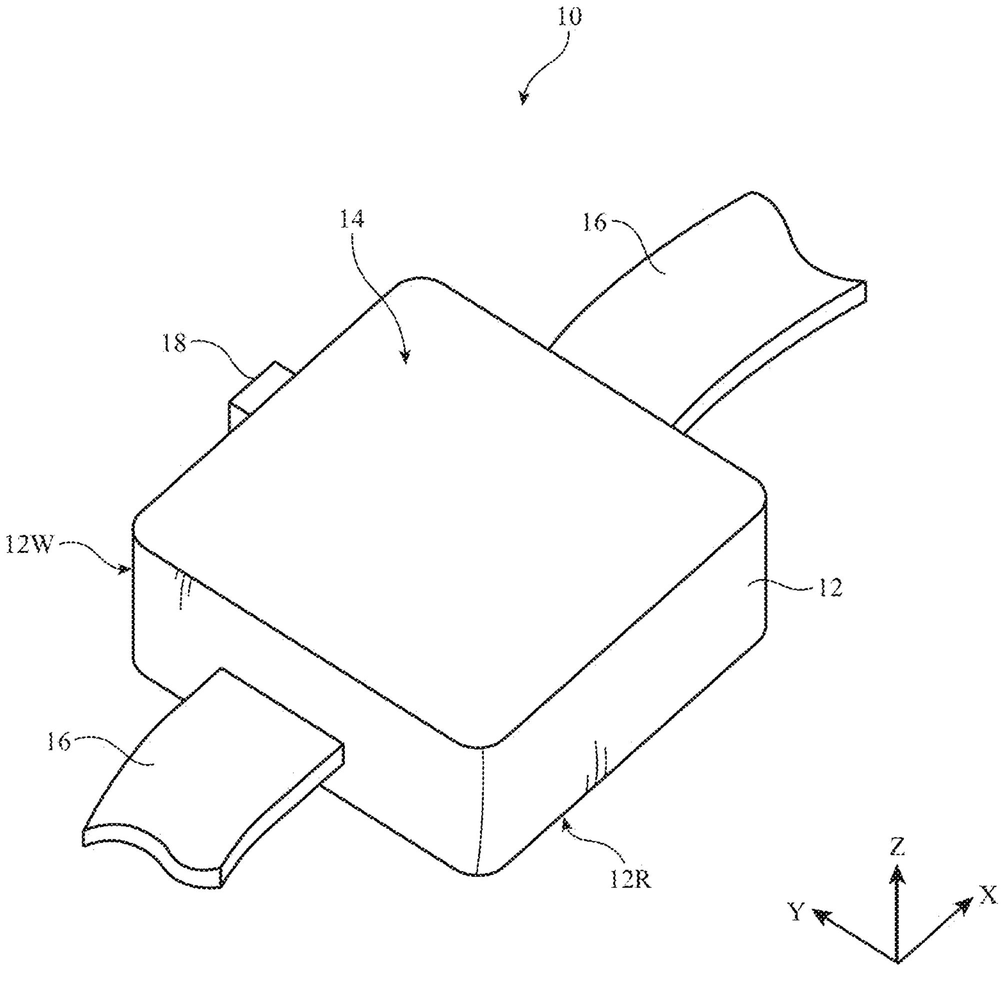
FIG. 1 is a perspective view of an illustrative electronic device with wireless circuitry in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device (e.g., virtual, augmented, or mixed reality glasses or goggles), or another wearable or miniature device, a handheld device such as a cellular telephone, a media player, or another small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment. In the illustrative configuration of FIG. 1 and in other examples described herein, device 10 is a portable device such as a wristwatch (e.g., a smart watch). Other configurations may be used for device 10 if desired. The example of FIG. 1 is illustrative and non-limiting.

In the example of FIG. 1, device 10 includes a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may include metal sidewalls such as sidewalls 12W or sidewalls formed from other materials. Examples of metal materials that may be used for forming sidewalls 12W include stainless steel, aluminum, silver, gold, titanium, metal alloys, or any other desired conductive material. Sidewalls 12W may sometimes be referred to herein as housing sidewalls 12W or conductive housing sidewalls 12W.

Display 14 may be formed at (e.g., mounted on) the front side (face) of device 10. Housing 12 may include a rear housing wall 12R on the rear side (face) of device 10 opposite the front face of device 10. Conductive housing sidewalls 12W may surround the lateral periphery of device 10 (e.g., conductive housing sidewalls 12W may extend around peripheral edges of device 10). Rear housing wall 12R may be formed from conductive materials and/or dielectric materials. Examples of dielectric materials that may be used for forming rear housing wall 12R include plastic, glass, sapphire, ceramic, wood, polymer, combinations of these materials, or any other desired dielectrics.

Rear housing wall 12R and/or display 14 may extend across some or all of the length (e.g., parallel to the X-axis of FIG. 1) and width (e.g., parallel to the Y-axis) of device 10. Conductive housing sidewalls 12W may extend across some or all of the height of device 10 (e.g., parallel to Z-axis). Conductive housing sidewalls 12W and/or rear housing wall 12R may form one or more exterior surfaces of device 10 (e.g., surfaces that are visible to a user of device 10) and/or may be implemented using internal structures that do not form exterior surfaces of device 10 (e.g., conductive or dielectric housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide housing walls 12R and/or 12W from view of the user).

If desired, housing 12 may include one or more dielectric-filled slots (not shown). The dielectric-filled slots, sometimes referred to herein as gaps, openings, or splits, may divide the conductive material in housing 12 into different conductive housing portions. The slots may be filled with dielectric material such as plastic, polymer, sapphire, glass, rubber, or ceramic. In some implementations, housing 12 may include a slot that extends along three of the four peripheral edges of device 10 and that separates conductive housing sidewalls 12W from a conductive upper portion of housing 12 (sometimes referred to herein as a conductive turret, conductive top portion, conductive ring, or conductive bezel of housing 12) along three sides of device 10. The slot may be used to separate a radiating element in an antenna of device 10 from ground structures in the antenna. This may allow the radiating element to conduct antenna currents along its edges (e.g., at the slot) that produce electric fields associated with the transmission and/or reception of radio-frequency signals. In other implementations, this type of peripheral slot may be omitted and a lateral slot between an active area of display 14 and conductive housing sidewalls 12W may be used to separate conductive housing sidewalls 12W from an antenna radiating element formed from conductive portions of display 14.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. Display 14 may also be force sensitive and may gather force input data associated with how strongly a user or object is pressing against display 14.

Display 14 may include an array of display pixels formed from liquid crystal display (LCD) components, an array of electrophoretic display pixels, an array of plasma display pixels, an array of organic light-emitting diode (OLED) display pixels, an array of electrowetting display pixels, or display pixels based on other display technologies. Display 14 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10, for example.

Device 10 may include buttons such as button 18. There may be any suitable number of buttons in device 10 (e.g., a single button, more than one button, two or more buttons, five or more buttons, etc.). Buttons may be located in openings in housing 12 (e.g., openings in conductive housing sidewall 12W or rear housing wall 12R) or in an opening in display 14 (as examples). Buttons may be rotary buttons, sliding buttons, buttons that are actuated by pressing on a movable button member, etc. Button members for buttons such as button 18 may be formed from metal, glass, plastic, or other materials. Button 18 may sometimes be referred to as a crown in implementations where device 10 is a wristwatch device.

Device 10 may, if desired, be coupled to a strap such as strap 16. Strap 16 may be used to hold device 10 against a user's wrist (as an example). Strap 16 may sometimes be referred to herein as wrist strap 16. In the example of FIG. 1, wrist strap 16 is connected to opposing sides of device 10. Conductive housing sidewalls 12W may include attachment structures for securing wrist strap 16 to housing 12 (e.g., lugs or other attachment mechanisms that configure housing 12 to receive wrist strap 16). Wrist strap 16 may be removable if desired. Configurations that do not include straps may also be used for device 10.

Figure 2:
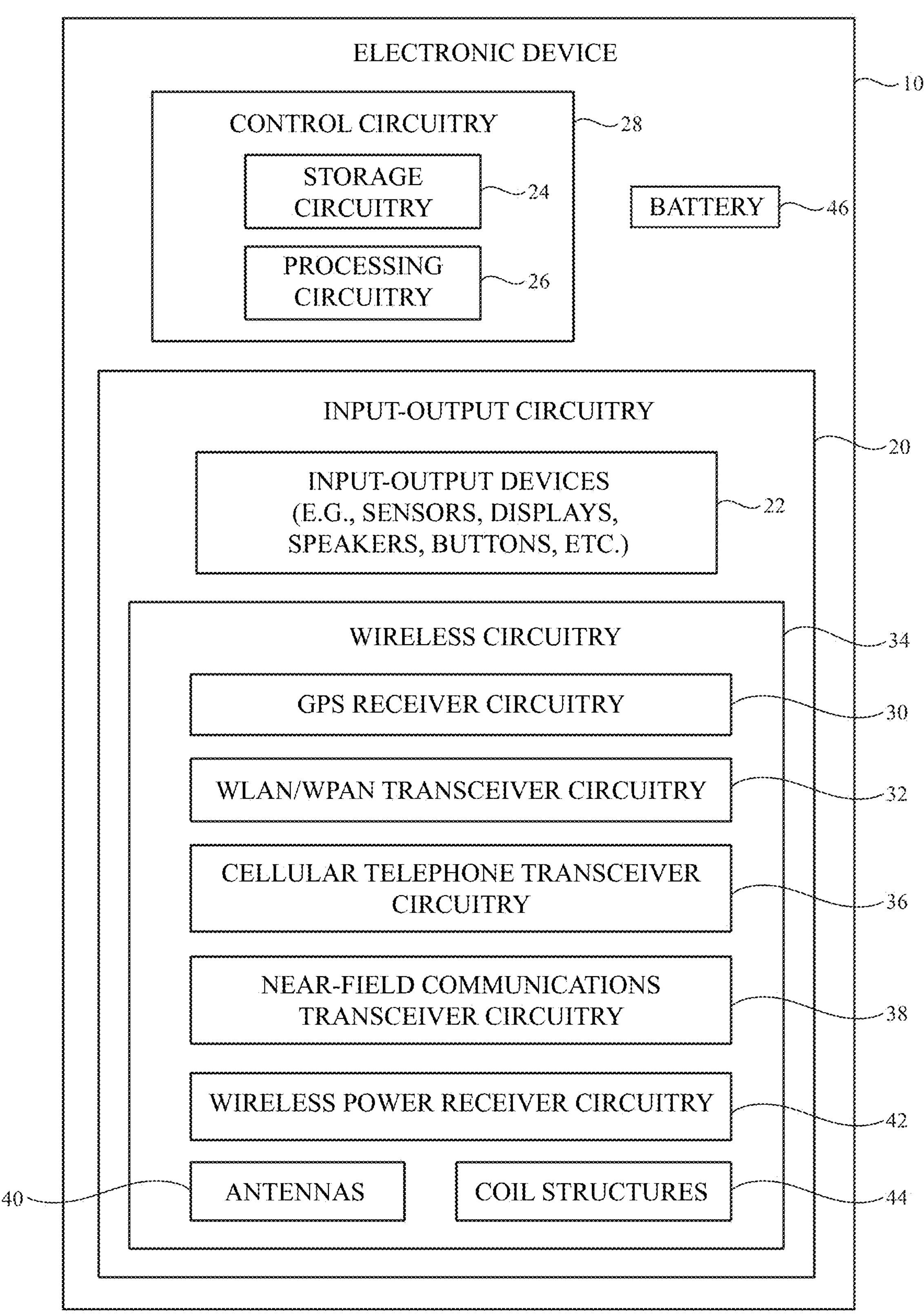
FIG. 2 is a schematic diagram of an illustrative electronic device with wireless circuitry in accordance with some embodiments.

A schematic diagram showing illustrative components that may be included in device 10 is shown in FIG. 2. As shown in FIG. 2, device 10 may include control circuitry 28. Control circuitry 28 may include storage such as storage circuitry 24. Storage circuitry 24 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 26. Processing circuitry 26 may be used to control the operation of device 10. Processing circuitry 26 may include on one or more processors such as microprocessors, microcontrollers, digital signal processors, host processors, baseband processor integrated circuits, application specific integrated circuits, central processing units (CPUs), graphics processing units (GPUs), etc. Control circuitry 28 may be configured to perform operations in device 10 using hardware (e.g., dedicated hardware or circuitry), firmware, and/or software. Software code for performing operations in device 10 may be stored on storage circuitry 24 (e.g., storage circuitry 24 may include non-transitory (tangible) computer readable storage media that stores the software code). The software code may sometimes be referred to as program instructions, software, data, instructions, or code. Software code stored on storage circuitry 24 may be executed by processing circuitry 26.

Control circuitry 28 may be used to run software on device 10 such as external node location applications, satellite navigation applications, internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols-sometimes referred to as Wi-Fi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch screens, displays without touch sensor capabilities, buttons, scrolling wheels, touch pads, key pads, keyboards, microphones, cameras, buttons, speakers, status indicators, light sources, audio jacks and other audio port components, vibrators or other haptic feedback engines, digital data port devices, light sensors (e.g., infrared light sensors, visible light sensors, etc.), light-emitting diodes, motion sensors (accelerometers), capacitance sensors, proximity sensors, magnetic sensors, force sensors (e.g., force sensors coupled to a display to detect pressure applied to the display), etc.

Input-output circuitry 22 may include wireless circuitry 34. Wireless circuitry 34 may include wireless power receiving coil structures such as coil structures 44 and wireless power receiver circuitry such as wireless power receiver circuitry 42. Device 10 may use wireless power receiver circuitry 42 and coil structures 44 to receive wirelessly transmitted power (e.g., wireless charging signals) from a wireless power adapter (e.g., a wireless power transmitting device such as a wireless charging mat or other device). Coil structures 44 (sometimes referred to herein as coil 44) may include one or more inductive coils that use resonant inductive coupling (near field electromagnetic coupling) with a wireless power transmitting coil on the wireless power adapter.

The wireless power adapter may pass AC currents through the wireless power transmitting coil to produce a time varying electromagnetic (e.g., magnetic) field that is received as wireless power (wireless charging signals) by coil structures 44 in device 10. An illustrative frequency for the wireless charging signals is 200 kHz. Other frequencies may be used, if desired (e.g., frequencies in the kHz range, the MHz range, or in the GHz range, frequencies of 1 kHz to 1 MHz, frequencies of 1 kHz to 100 MHz, frequencies less than 100 MHz, frequencies less than 1 MHz, etc.). When the time varying electromagnetic field is received by coil structures 44, corresponding alternating-current (AC) currents are induced in the coil structures. Wireless power receiver circuitry 42 may include converter circuitry such as rectifier circuitry. The rectifier circuitry may include rectifying components such as synchronous rectification metal-oxide-semiconductor transistors arranged in a bridge network, and may convert these currents from coil structures 44 into a DC voltage for powering device 10. The DC voltage produced by the rectifier circuitry in wireless power receiver circuitry 42 can be used in powering (charging) an energy storage device such as battery 46 and can be used in powering other components in device 10.

To support wireless communications, wireless circuitry 34 may include baseband circuitry (e.g., one or more baseband processors or other circuitry that operates on baseband signals) and radio-frequency (RF) transceiver circuitry. The transceiver circuitry may include one or more integrated circuits, power amplifier circuitry, low-noise input amplifiers, passive RF components, mixer circuitry, synthesizers, modulators, demodulators, upconverters, downconverters, and/or other transceiver circuitry. Wireless circuitry 34 may also include one or more antennas such as antennas 40, transmission lines, and other circuitry for handling RF wireless signals. One or more radio-frequency front end modules may be disposed along the transmission lines if desired. Wireless signals can also be sent using light (e.g., using infrared communications).

Wireless circuitry 34 may include radio-frequency transceiver circuitry for handling transmission and/or reception of radio-frequency signals within corresponding frequency bands at radio frequencies (sometimes referred to herein as communications bands or simply as "bands"). For example, wireless circuitry 34 may include wireless local area network (WLAN) and wireless personal area network (WPAN) transceiver circuitry 32. Transceiver circuitry 32 may handle a 2.4 GHz WLAN band (e.g., from 2400 to 2480 MHz), a 5 GHZ WLAN band (e.g., from 5180 to 5825 MHz), a Wi-Fi® 6E band (e.g., from 5925-7125 MHz), a Wi-Fi® 7 or 8 band, and/or other Wi-Fi® bands (e.g., from 1875-5160 MHz or higher). Transceiver circuitry 32 may sometimes be referred to herein as WLAN/WPAN transceiver circuitry 32.

Wireless circuitry 34 may use cellular telephone transceiver circuitry 36 for handling wireless communications in frequency ranges (communications bands) such as a cellular low band (LB) from 600 to 960 MHz, a cellular low-midband (LMB) from 1410 to 1510 MHz, a cellular mid-band (MB) from 1710 to 2170 MHz, a cellular high band (HB) from 2300 to 2700 MHz, a cellular ultra-high band (UHB) from 3300 to 5000 MHz, or other communications bands between 600 MHz and 5000 MHz or other suitable frequencies, 2G bands, 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, other centimeter or millimeter wave frequency bands between 10-300 GHz (as examples), 3GPP 6G bands (e.g., at sub-THz frequencies from around 100 GHz to around 1 THz), etc. Cellular telephone transceiver circuitry 36 may handle voice data and non-voice data.

Wireless circuitry 34 may include satellite navigation system circuitry such as Global Positioning System (GPS) receiver circuitry 30. GPS receiver circuitry 30 may receive GPS signals in satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS) band, or other bands. Satellite navigation system signals for receiver circuitry 30 are received from a constellation of satellites orbiting the earth.

Wireless circuitry 34 can include circuitry for other short-range and long-range wireless links if desired. For example, wireless circuitry 34 may include circuitry for receiving television and radio signals, paging system transceivers, near field communications (NFC) transceiver circuitry 38 (e.g., an NFC transceiver operating at 13.56 MHz or another suitable frequency), ultra-wideband transceiver circuitry (e.g., transceiver circuitry that operates at ultra-wideband (UWB) frequency bands under the IEEE 802.15.4 protocol and/or other ultra-wideband communications protocols (e.g., a first UWB communications band at 6.5 GHz and/or a second UWB communications band at 8.0 GHz)), transceiver circuitry that operates using communications bands under the family of 3GPP wireless communications standards, transceiver circuitry that operates using communications bands under the IEEE 802.XX family of standards, transceiver circuitry that operates using industrial, scientific, and medical (ISM) bands such as an ISM band between around 900 MHz and 950 MHz or other ISM bands below or above 1 GHz, transceiver circuitry that operates using one or more unlicensed bands, transceiver circuitry that operates using one or more bands reserved for emergency and/or public services, and/or any other desired frequency bands of interest. Wireless circuitry 34 may also be used to perform spatial ranging operations if desired.

In NFC links, wireless signals are typically conveyed over a few inches at most. In satellite navigation system links, cellular telephone links, and other long-range links, wireless signals are typically used to convey data over thousands of feet or miles. In WLAN and WPAN links at 2.4 and 5 GHz and other short-range wireless links, wireless signals are typically used to convey data over tens or hundreds of feet. Antenna diversity schemes may be used if desired to ensure that the antennas that have become blocked or that are otherwise degraded due to the operating environment of device 10 can be switched out of use and higher-performing antennas used in their place. Multiple-input and multiple-output (MIMO) schemes and/or carrier aggregation (CA) schemes may be used to boost data rates and wireless performance.

Wireless circuitry 34 may include antennas 40. Antennas 40 may be formed using any desired type of antenna architecture. For example, antennas 40 may include antennas with resonating elements that are formed from patch antenna structures (e.g., shorted patch antenna structures), slot antenna structures, loop antenna structures, stacked patch antenna structures, antenna structures having parasitic elements, inverted-F antenna structures, planar inverted-F antenna structures, helical antenna structures, monopole antennas, dipole antenna structures, Yagi (Yagi-Uda) antenna structures, surface integrated waveguide structures, hybrids of these designs, etc. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time).

Different types of antennas may be used for different bands/RATs and combinations of bands/RATs. For example, one type of antenna may be used in forming a local wireless link antenna whereas another type of antenna is used in forming a remote wireless link antenna. If desired, space may be conserved within device 10 by using a single antenna to handle two or more different communications bands. If desired, a combination of antennas for covering multiple frequency bands and dedicated antennas for covering a single frequency band may be used. For example, a first antenna 40 in device 10 may be used to handle communications in a Wi-Fi® or Bluetooth® communication band at 2.4 GHz, a GPS L1 band at 1575 MHz, a GPS L5 band at 1176 MHz, and one or more cellular telephone communications bands such as a cellular midband (MB) from 1710 to 2170 MHz, a cellular high band (HB) from 2300 to 2700 MHZ, whereas a second antenna 40 in device 10 is used to handle communications in a cellular low band (LB) and the cellular HB.

In some implementations that are described herein as an example, antennas 40 may include at least one far field antenna 40F and at least one near field antenna 40N. A far field antenna 40F conveys radio-frequency signals in the far field domain (e.g., beyond the Fraunhofer and Fresnel diffraction regions of the antenna given the wavelength of operation and the size, area, radiating length, and/or volume of the antenna). The far field domain may, for example, begin at distances greater than or equal to around twice the operating wavelength of the antenna. A far field antenna 40F may, for example, convey radio-frequency signals in a non-NFC frequency band such as a cellular telephone band, a satellite navigation band, a UWB band, a WLAN band, or a WPAN band. These bands, which operate over distances associated with the far field domain, are sometimes also referred to herein as far field bands. Far field bands may include frequencies greater than or equal to around 600 MHZ, for example. Radio-frequency signals conveyed in a far field band are sometimes referred to herein as far field signals. Wireless data (e.g., data packets, frames, symbols, bits, etc.) carried by far field signals are sometimes referred to herein as far field data.

On the other hand, a near field antenna 40N conveys radio-frequency signals in the near field domain (e.g., closer than the Fresnel diffraction region of the antenna given the wavelength of operation and the size, area, radiating length, and/or volume of the antenna). The near field domain may, for example, extend from the antenna to a distance approximately equal to twice the operating wavelength of the antenna (e.g., including reactive and/or radiative near field regions of the antenna). A near field antenna 40N may, for example, convey radio-frequency signals in an NFC frequency band. The NFC frequency band may be, for example, a 13.56 MHz band. The NFC band is sometimes also referred to herein simply as a near field band. Radio-frequency signals conveyed in a near field band are sometimes referred to herein as near field signals or NFC signals. Wireless data (e.g., data packets, frames, symbols, bits, etc.) carried by near field signals are sometimes referred to herein as near field data or NFC data.

While control circuitry 28 is shown separately from wireless circuitry 34 in the example of FIG. 1 for the sake of clarity, wireless circuitry 34 may include processing circuitry (e.g., one or more processors) that forms a part of processing circuitry 26 and/or storage circuitry that forms a part of storage circuitry 24 of control circuitry 28 (e.g., portions of control circuitry 28 may be implemented on wireless circuitry 34). As an example, control circuitry 28 may include baseband circuitry (e.g., one or more baseband processors), digital control circuitry, analog control circuitry, and/or other control circuitry that forms part of radio wireless circuitry 34. The baseband circuitry may, for example, access a communication protocol stack on control circuitry 28 (e.g., storage circuitry 24) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 34.

Figure 3:
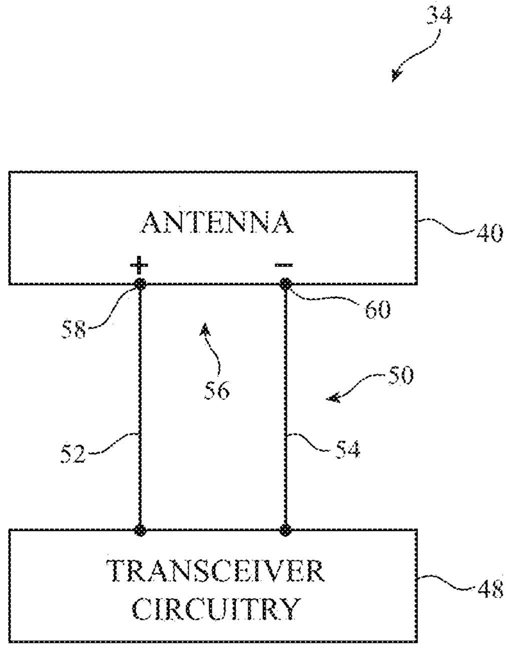
FIG. 3 is a diagram of illustrative wireless circuitry in an electronic device in accordance with some embodiments.

A schematic diagram of wireless circuitry 34 is shown in FIG. 3. As shown in FIG. 3, wireless circuitry 34 may include transceiver circuitry 48 (e.g., cellular telephone transceiver circuitry 36 of FIG. 2, WLAN/WPAN transceiver circuitry 32, NFC transceiver circuitry 38, etc.) that is coupled to a given antenna 40 using a radio-frequency transmission line path such as radio-frequency transmission line path 50.

To provide antenna structures such as antenna 40 with the ability to cover different frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components that tune the antenna over communications (frequency) bands of interest. The tunable components may be part of a tunable filter or tunable impedance matching network, may be part of an antenna resonating element, may span a gap between an antenna resonating element and antenna ground, etc.

Radio-frequency transmission line path 50 may include one or more radio-frequency transmission lines (sometimes referred to herein simply as transmission lines). Radio-frequency transmission line path 50 (e.g., the transmission lines in radio-frequency transmission line path 50) may include a positive signal conductor such as signal conductor 52 and a ground signal conductor such as ground conductor 54.

The transmission lines in radio-frequency transmission line path 50 may, for example, include coaxial cable transmission lines (e.g., ground conductor 54 may be implemented as a grounded conductive braid surrounding signal conductor 52 along its length), stripline transmission lines (e.g., where ground conductor 54 extends along two sides of signal conductor 52), microstrip transmission lines (e.g., where ground conductor 54 extends along one side of signal conductor 52), coaxial probes realized by a metalized via, edge-coupled microstrip transmission lines, edge-coupled stripline transmission lines, waveguide structures (e.g., coplanar waveguides or grounded coplanar waveguides), combinations of these types of transmission lines and/or other transmission line structures, etc.

Transmission lines in radio-frequency transmission line path 50 may be integrated into rigid and/or flexible printed circuit boards. In one suitable arrangement, radio-frequency transmission line path 50 may include transmission line conductors (e.g., signal conductors 52 and ground conductors 54) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network may include components such as inductors, resistors, and capacitors used in matching the impedance of antenna 40 to the impedance of radio-frequency transmission line path 50. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components. If desired, one or more single-ended to differential signal converters such as one or more baluns may be disposed on transmission line path 50 for converting radio-frequency signals between single ended and differential signals (e.g., in implementations where antenna 40 is a near field antenna 40N and where transceiver circuitry 48 includes an NFC transceiver).

Radio-frequency transmission line path 50 may be coupled to antenna feed structures associated with antenna 40. As an example, antenna 40 may form an inverted-F antenna, a planar inverted-F antenna, a patch antenna, a loop antenna, an NFC coil or loop antenna, or other antenna having an antenna feed 56 with a positive antenna feed terminal such as terminal 58 and a ground antenna feed terminal such as terminal 60. Positive antenna feed terminal 58 may be coupled to an antenna resonating (radiating) element within antenna 40. Ground antenna feed terminal 60 may be coupled to an antenna ground in antenna 40 or may be coupled to an end of the antenna resonating element opposite positive antenna feed terminal 58 (e.g., in implementations where antenna 40 is a near field antenna 40N or a loop antenna). Signal conductor 52 may be coupled to positive antenna feed terminal 58 and ground conductor 54 may be coupled to ground antenna feed terminal 60.

Other types of antenna feed arrangements may be used if desired. For example, antenna 40 may be fed using multiple feeds each coupled to a respective port of transceiver circuitry 48 over a corresponding transmission line. If desired, signal conductor 52 may be coupled to multiple locations on antenna 40 (e.g., antenna 40 may include multiple positive antenna feed terminals coupled to signal conductor 52 of the same radio-frequency transmission line path 50). Switches may be interposed on the signal conductor between transceiver circuitry 48 and the positive antenna feed terminals if desired (e.g., to selectively activate one or more positive antenna feed terminals at any given time). The illustrative feeding configuration of FIG. 3 is merely illustrative.

The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to free space through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Figure 4:
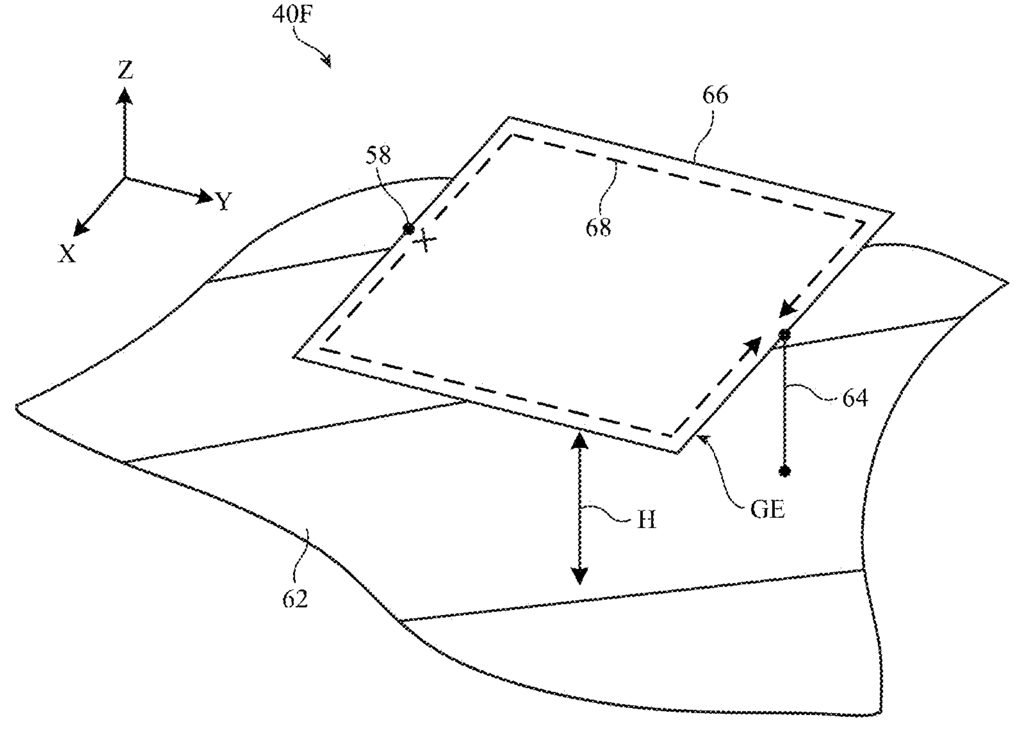
FIG. 4 is a perspective view of an illustrative far field antenna in accordance with some embodiments.

It may be desirable to provide device 10 with both a near field antenna 40N and a far field antenna 40F that convey wireless signals (e.g., radio-frequency signals carrying wireless data) within the hemisphere above the front face of device 10 (e.g., through the front face and display 14 of device 10). Any desired antenna structures may be used for implementing a far field antenna 40F and a near field antenna 40N that convey radio-frequency signals through the front face of device 10 (sometimes also referred to herein as a front-facing antennas of device 10). FIG. 4 is a perspective view showing one example of antenna structures that may be used to implement a front-facing far field antenna 40F in device 10.

As shown in FIG. 4, far field antenna 40F may include an antenna resonating element 66. Antenna resonating element 66 may be vertically separated from and may extend substantially parallel to a ground plane such as antenna ground 62. Antenna resonating element 66 and antenna ground 62 may, for example, be vertically separated by at least a distance H. Antenna ground 62 may be formed from conductive traces patterned onto a dielectric substrate such as a rigid or flexible printed circuit board substrate, metal foil, stamped sheet metal, electronic device housing structures, or any other desired conductive structures (e.g., ground structures).

Antenna resonating element 66 may be formed from conductive traces, electrodes, and/or circuitry within a display panel of display 14 (FIG. 1), as one example. The conductive traces, electrodes, and/or circuitry may be formed from copper, nickel, gold, conductive portions of one or more transistor layers, and/or transparent conductive materials such as indium tin oxide (ITO) in the display panel.

The length of the sides of antenna resonating element 66 may be selected so that far field antenna 40F resonates (radiates) at desired operating frequencies. For example, the sides of antenna resonating element 66 may each have a length that is approximately equal to one-half or one-quarter of the wavelength of the signals conveyed by antenna 40 (e.g., the effective wavelength given the dielectric properties of the materials surrounding patch element 66, where effective wavelength is equal to the free space wavelength multiplied by a constant given by the dielectric properties of the materials surrounding antenna resonating element 66).

Positive antenna feed terminal 58 may be coupled to antenna resonating element 66 (e.g., at a feed edge of antenna resonating element 66). One or more grounding structures such as grounding structure 64 may couple antenna resonating element 66 to antenna ground 62. Grounding structure 64 may, for example, couple a ground edge GE of antenna resonating element 66 to antenna ground 62. Ground edge GE may be the edge opposite to the feed edge of antenna resonating element 66, for example. Grounding structure 64 may include an integral portion of antenna resonating element 66 that is bent or folded towards antenna ground 62, conductive traces on a printed circuit (e.g., on a feed flex and/or a display flex for the display panel in display 14 of FIG. 1), sheet metal, solder, welds, conductive adhesive, conductive foam, metal foil, a conductive portion of the housing of device 10, a conductive spring, a conductive gasket, a conductive bracket, a conductive clip, a conductive prong, a conductive pin, and/or any other desired conductive structures for coupling (e.g., electrically connecting) antenna resonating element 66 to antenna ground 62.

Grounding structure 64 may serve to electrically short antenna resonating element 66 to antenna ground 62. Grounding structure 64 may therefore sometimes be referred to as a short path or return path for antenna resonating element 66. This may configure far field antenna 40 to form a type of patch antenna sometimes referred to as a shorted patch antenna or a PIFA. Grounding structure 64 may configure antenna current to flow along the perimeter of antenna resonating element 66 as shown by arrow 68. This length may be selected to configure far field antenna 40F to convey radio-frequency signals within corresponding frequency bands. The antenna current may be produced by positive antenna feed terminal 58 (e.g., during signal transmission) or by incident radio-frequency signals received by far field antenna 40F. During signal reception, the antenna current may pass the radio-frequency signals to transceiver circuitry on device 10 via positive antenna feed terminal 58.

Antenna resonating element 66 is sometimes also referred to herein as antenna radiating element 66, antenna resonating element arm 66, antenna radiating element arm 66, antenna resonating arm 66, antenna radiating arm 66, radiating arm 66, resonating arm 66, resonating element 66, radiating element 66, antenna arm 66, antenna element 66, resonator 66, radiator 66, arm 66, patch element 66, antenna patch 66, patch 66, radiating patch 66, resonating patch 66, grounded antenna radiating element 66, grounded antenna resonating element arm 66, grounded antenna radiating element arm 66, grounded antenna resonating arm 66, grounded antenna radiating arm 66, grounded radiating arm 66, grounded resonating arm 66, grounded resonating element 66, grounded radiating element 66, grounded antenna arm 66, grounded antenna element 66, grounded resonator 66, grounded radiator 66, grounded arm 66, grounded patch element 66, grounded antenna patch 66, grounded patch 66, grounded radiating patch 66, or grounded resonating patch 66.

The example of FIG. 4 is illustrative and non-limiting. Antenna resonating element 66 may have a substantially square shape in which all of the sides of antenna resonating element 66 are the same length or may have a different rectangular shape. More generally, antenna resonating element 66 may be other shapes having any desired number of straight and/or curved edges (e.g., a round shape, an elliptical shape, a polygonal shape, a square shape with rounded corners, etc.). Far field antenna 40F may be implemented using other antenna architectures. Antenna resonating element 66 may be formed from multiple conductive structures in device 10 in a manner that serves to integrate antenna resonating element 66 into device 10 while allowing antenna 40 to convey radio-frequency signals through the front face of device 10 with satisfactory levels of wireless performance.

Figure 5:
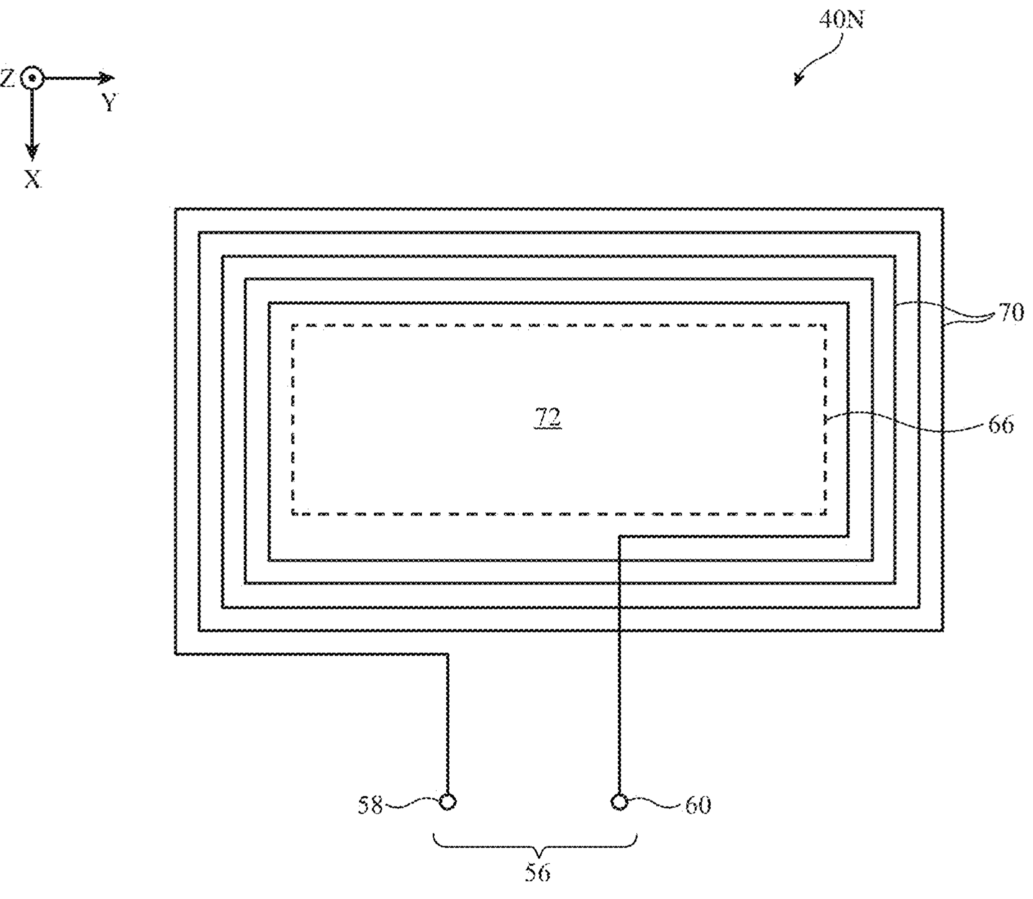
FIG. 5 is a schematic top view of an illustrative near field antenna in accordance with some embodiments.

FIG. 5 is a schematic top view showing one example of antenna structures that may be used to implement a front-facing near field antenna 40N in device 10. As shown in FIG. 5, near field antenna 40N may have an antenna resonating element formed a conductive trace 70 that extends from positive antenna feed terminal 58 to ground antenna feed terminal 60 of antenna feed 56. Conductive trace 70 may follow or extend along a coiled or spiral path (e.g., may include segments that form or include one or more coils, turns, or windings of the conductive trace) around a central region (area) 72 that is free from conductive traces in near field antenna 40N. Put differently, conductive trace 70 may laterally surround, extend, wrap, wind, coil, or turn around central region 72.

Conductive trace 70 may be disposed, layered, deposited, or otherwise patterned onto an underlying dielectric substrate. In implementations that are described herein as an example, the dielectric substrate may be a substrate layer in display 14 (FIG. 1). If desired, conductive trace 70 may be disposed on multiple layers of the substrate (e.g., conductive trace 70 may include different turns or windings on different layers of the substrate and that are coupled together using conductive vias extending through one or more layers of the substrate). This may, for example, help to maximize the number of windings of near field antenna 40N for a given lateral footprint. Near field antenna 40N may have a central axis extending through the center of central region 72 parallel to the Z-axis and perpendicular to the lateral area spanned by the windings of conductive trace 70.

In the example of FIG. 5, conductive trace 70 has five turns, windings, loops, or coils around central region 72. This is illustrative and non-limiting. In general, conductive trace 70 may have any desired number of turns, coils, or windings around central region 72 (e.g., a single turn, two turns, three turns, four turns, more than five turns, a non-integer number of turns, etc.). In general, greater numbers of windings increases the amount of near field electromagnetic coupling between near field antenna 40N and an overlapping external device such as an NFC reader, RFID tag, or other NFC device.

In the example of FIG. 5, conductive trace 70 has a rectangular or square lateral outline (e.g., follows a rectangular coil or spiral path having linear parallel and orthogonal segments). This is illustrative and non-limiting. If desired, the corners of conductive trace 70 may be rounded or angled. In general, conductive trace 70 may have any desired shape or lateral outline having any desired number of linear and/or curved segments extending at any desired angles (e.g., may follow a circular path, an elliptical path, a rectangular or square path having rounded edges, a hexagonal path, an octagonal path, a triangular path, a pentagonal path, etc.). Conductive trace 70 is sometimes also referred to herein as coil 70, NFC coil 70, near field antenna resonating element 70, NFC antenna resonating element 70, antenna element 70, or NFC element 70.

When conveying near field signals, antenna current flows between antenna feed terminals 58 and 60 through coil 70 and around central region 72. The antenna current flowing through coil 70 produces magnetic fields extending vertically through central region 72 (e.g., parallel to the Z-axis). These magnetic fields may induce corresponding current to flow in an overlapping NFC antenna on an external device (or vice versa), allowing NFC signals and corresponding wireless data to be conveyed between near field antenna 40N and the external device.

To help minimize space consumption in device 10, both near field antenna 40N and far field antenna 40F may be integrated into display 14 (FIG. 1) for conveying radio-frequency signals through the front face of device 10. To help optimize space consumption, the antenna resonating element 66 of far field antenna 40F (FIG. 4) may be disposed within and/or may overlap central region 72 of near field antenna 40N (e.g., within display 14 of FIG. 1). Antenna resonating element 66 may, for example, overlap central region 72 without overlapping any of coil 70 (e.g., coil 70 may extend around the lateral periphery of antenna resonating element 66). This may help to prevent coil 70 from blocking or otherwise impeding radio-frequency signals conveyed by far field antenna 40F through the front face of device 10.

Figure 6:
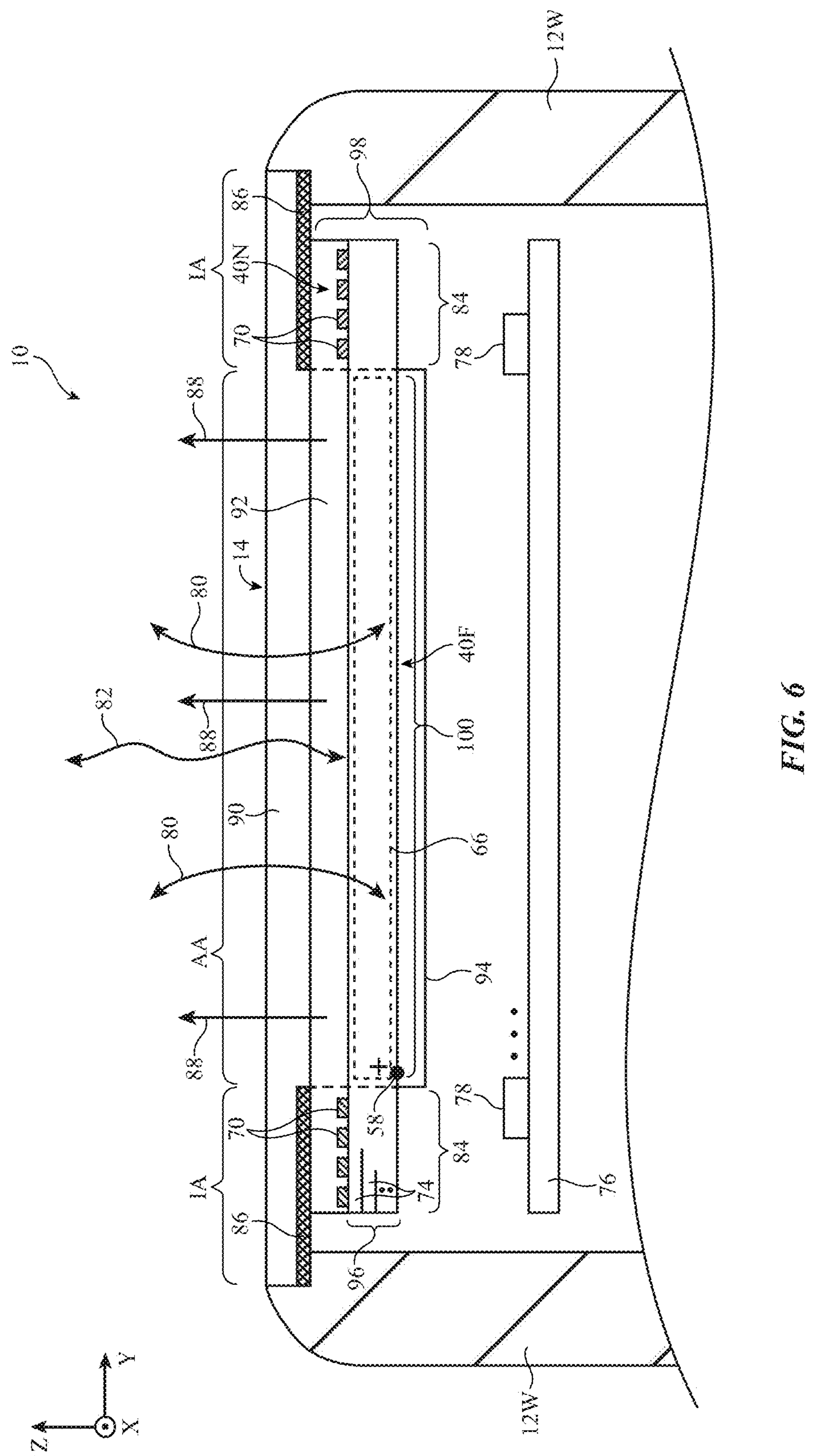
FIG. 6 is a cross-sectional side view of an illustrative electronic device having a far field antenna and a near field antenna integrated into a display at a front face of the electronic device in accordance with some embodiments.

FIG. 6 is a cross-sectional side view showing how near field antenna 40N and far field antenna 40F may be integrated into display 14 for conveying radio-frequency signals through the front face of device 10. As shown in FIG. 6, conductive housing sidewalls 12W may extend from the rear face of device 10 (rear housing wall 12R of FIG. 1) towards the front face of device 10.

Display 14 may be mounted to conductive housing sidewalls 12W. Display 14 may include a display cover layer 90. Display cover layer 90 may be mounted to a ledge or datum of conductive housing sidewalls 12W, for example. Display 14 may include a display module 98 layered onto the interior surface of display cover layer 90. Display cover layer 90 may be formed from optically transparent dielectric materials such as glass, plastic, sapphire, zirconia, etc.

Display module 98 may include a display panel 96, one or more polymer layers 92, and a printed circuit board (PCB) such as display PCB 94. Polymer layer(s) 92 may couple, attach, affix, adhere, and/or secure display panel 96 to the interior surface of display cover layer 90. Polymer layer(s) 92 may include one or more layers of adhesive such as optically clear adhesive (OCA) and/or one or more planarization layers, as examples. Polymer layer(s) 92 are sometimes also referred to herein as adhesion layer(s) 92.

Display PCB 94 may be a rigid PCB or a flexible printed circuit. Display panel 96 may include one or more vertically stacked layers such as layers 74. Layers 74 may include dielectric layers, semiconductor layers, and/or conductive (e.g., metallization) layers. One or more conductive layers 74 in display panel 96 may include pixel circuitry (e.g., LED pixels or OLED pixels) within a central active area AA of display 14. The pixel circuitry generates, emits, outputs, and/or displays visible image light 88 (e.g., images/video) through display cover layer 90. The pixel circuitry may contain thin film transistors (TFTs), light-emitting diodes (e.g., LEDs, OLEDs, etc.), and/or other display pixel circuitry. The pixel circuitry may be formed from optically transparent conductive material such as ITO, copper, and/or other conductive materials, semiconductor materials, and/or other materials, as examples.

One or more conductive layers 74 in display panel 96 may include touch sensor circuitry such as an array of touch sensor electrodes (e.g., resistive and/or capacitive touch circuitry) within active area AA of display 14. The touch sensor electrodes receive touch and/or force sensor input through display cover layer 90 and generate corresponding sensor data based on the received touch and/or force sensor input. The touch sensor electrodes may be formed from optically transparent conductive material such as ITO, copper, and/or other conductive materials, as examples. Forming the touch sensor electrodes from ITO may help to prevent the touch sensor electrodes from blocking the image light 88 output by pixel circuitry in display panel 96.

Display panel 96 has a central region (area) 100 and a peripheral region (area) 84 laterally surrounding central region 100. Central region 100 overlaps active area AA of display 14. Peripheral region 84 overlaps inactive area IA of display 14. Central region 100 of display panel 96 includes pixel circuitry that emits image light 88 and includes touch sensor electrodes that receive touch sensor input (e.g., within active area AA of display 14). Peripheral region 84 of display panel 96 may be inactive and/or may be free from pixel circuitry and touch sensor electrodes (e.g., display panel 96 does not emit image light 88 within peripheral region 84 and does not include touch sensor electrodes that generate sensor data within peripheral region 84). If desired, peripheral region 84 may include pixel driving circuitry that drives display pixels in central region 100 of display panel 96 and/or may include touch sensor driving/reading circuitry that drives and/or reads (senses) touch sensor electrodes in central region 100 of display panel 96.

Display PCB 94 may include conductive lines such as power lines, control lines, drive lines, read lines, sense lines, data lines, etc. Display PCB 94 overlaps central region 100 of display panel 96 and active area AA of display 14. If desired, display PCB 94 may extend along central region 100 of display panel 96 without extending into or overlapping inactive region 84. The conductive lines on display PCB 94 may convey display data (e.g., image data), control signals, and/or power from one or more components 78 (e.g., display driver circuitry) on logic board 76 (e.g., a main logic board of device 10) to display pixel circuitry in central region 100 of display panel 96. The conductive lines on display PCB 94 may also convey power to touch sensor electrodes in central region 100 of display panel 96 and/or may convey, to processing circuitry on components 78, touch sensor data generated by touch sensor electrodes in central region 100 of display panel 96.

Coil 70 of near field antenna 40N may be disposed within a portion of display module 98 overlapping inactive area IA of display 14 and peripheral region 84 of display panel 96. Coil 70 may, for example, be disposed on one or more layers 74 of display panel 96 within peripheral region 84. The central region of coil 70 (e.g., central region 72 of FIG. 5) may overlap central region 100 of display panel 96 and active area AA of display 14. This may prevent coil 70 from blocking the image light 88 produced by display panel 96. If desired, an opaque masking layer 86 (e.g., a black or colored ink layer) may be disposed on the interior surface of display cover layer 90 within inactive area IA of display 14 and overlapping peripheral region 84 of display panel 96. Opaque masking layer 86 may overlap coil 70 to help hide coil 70 from view. Opaque masking layer 86 may be omitted if desired.

Conductive material in central region 100 of display panel 96 (e.g., pixel circuitry, touch sensor electrodes, signal lines, ground lines, data lines, control lines, power lines, etc.) may collectively form the antenna resonating element 66 for far field antenna 40F. The positive antenna feed terminal 58 of far field antenna 40F may be coupled to display panel 96 to feed antenna resonating element 66. A radio-frequency transmission line path (not shown) may be coupled to the positive antenna feed terminal. If desired, some or all of the transmission line path may be integrated into display PCB 94. If desired, ground traces in display PCB 94 and/or a portion of conductive housing sidewalls 12W may form grounding structure 64 (FIG. 4) for far field antenna 40F. Far field antenna 40F may convey far field signals 82 through display cover layer 90.

At the same time, near field antenna 40N may convey NFC signals 80 through display module 98 and display cover layer 90. Disposing antenna resonating element 66 within central region 100 of display panel 96 and overlapping the central region 72 of coil 70 (FIG. 5) may serve to minimize electromagnetic interference and/or blocking between near field antenna 40N and far field antenna 40F.

Display PCB 94 is layered onto and overlaps central region 100 of display panel 96. Display PCB 94 may, if desired, be non-overlapping with respect to peripheral region 84 of display panel 96. In practice, near field antenna 40N is highly susceptible to electromagnetic interference from signals being conveyed on display PCB 94 (and vice versa). In scenarios where coil 70 overlaps or is disposed within central region 100 of display panel 96 (e.g., where coil 70 is interposed or sandwiched between display panel 96 and display PCB 94), a layer of ferrite may be required on or within display panel 96 (e.g., between coil 70 and display PCB 94) to prevent or mitigate electromagnetic interference between display PCB 94 and coil 70. Disposing coil 70 at a location overlapping or within peripheral region 84 reduces potential electromagnetic interference between coil 70 and display PCB 94, allowing the layer of ferrite to be omitted from display module 98. Put differently, display module 98 and display panel 96 may be free of ferrite material or ferrite layers (e.g., there may be no ferrite layers in display module 96 or display module 98, display module 98 and display panel 96 may be free from ferrite and/or ferrite layers, etc.) without substantial deterioration in the performance of display PCB 94, the pixel circuitry in display panel 96, the touch sensor electrodes in display panel 96, and the wireless performance of far field antenna 40F and near field antenna 40N (e.g., display panel 96 and display module 98 may be formed without any ferrite layers disposed therein or thereon). Because ferrite layers are relatively thick, omission of ferrite layers within display module 98 may serve to minimize the overall thickness of display panel 96 and display module 98, which may help to minimize the overall thickness of device 10 and/or may help to accommodate the presence of additional components within the interior volume of device 10.

Figure 7:
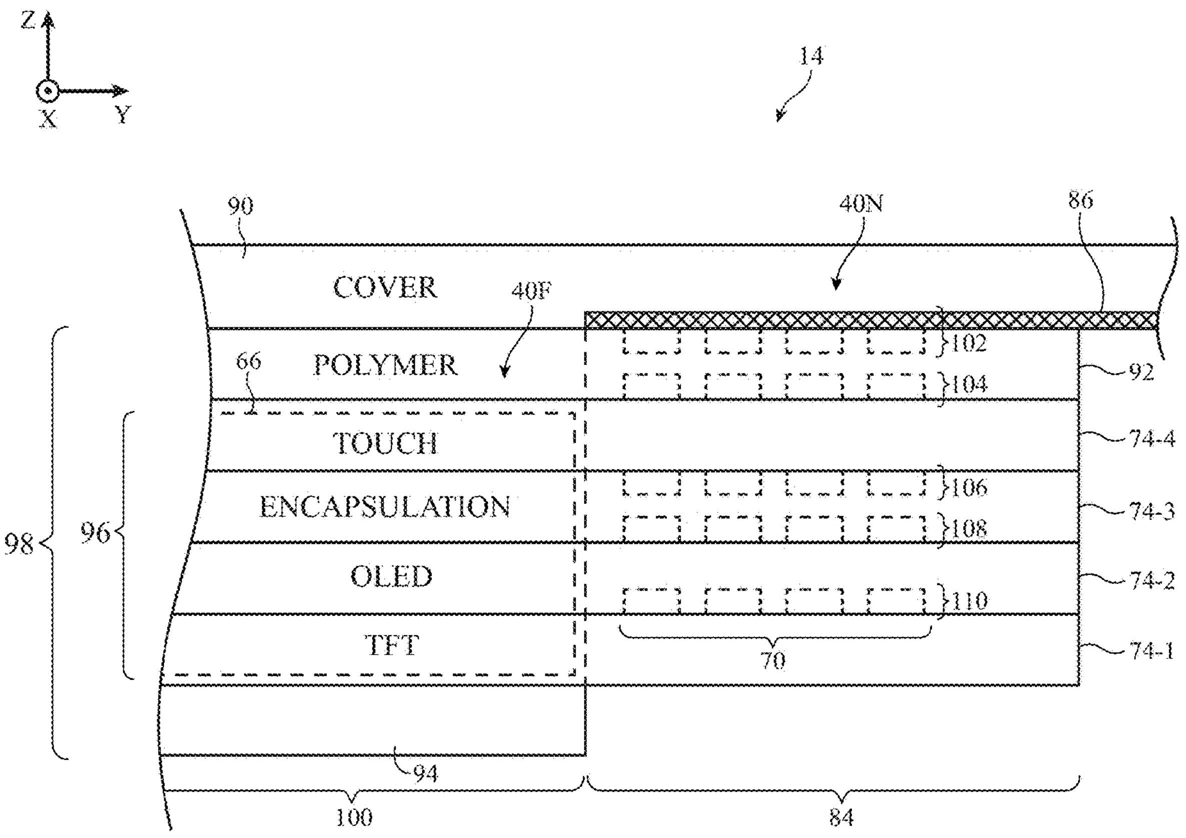
FIG. 7 is a cross-sectional side view of an illustrative display showing how a near field antenna may be disposed at different locations within the display in accordance with some embodiments.

Coil 70 may be disposed at any desired locations within display module 98. FIG. 7 is a cross-sectional side view of display 14 showing different locations for coil 70 within display module 98. As shown in FIG. 7, display panel 96 may be attached to display cover layer 90 by polymer layer(s) 92. Display panel 96 may include a stack of layers 74 such as at least a TFT layer 74-1, an OLED layer 74-2, an encapsulation layer 74-3, and a touch sensor layer 74-4. Within central region 100 of display panel 96, TFT layer 74-1 may be interposed between OLED layer 74-2 and display PCB 94. OLED layer 74-2 may be stacked or sandwiched between TFT layer 74-1 and encapsulation layer 74-3. Encapsulation layer 74-3 may be interposed between OLED layer 74-2 and touch sensor layer 74-4. Touch sensor layer 74-4 may be coupled to display cover layer 90 by polymer layer(s) 92. Polymer layer(s) 92 may include an OCA layer and/or a planarization layer, for example.

TFT layer 74-1 may include a layer or coating of TFTs. If desired, the layer or coating of TFTs may be disposed or layered on an underlying substrate. OLED layer 74-2 may include pixel circuitry such as an array of OLED display pixels. If desired, the pixel circuitry may be disposed or layered on an underlying substrate. OLED layer 74-2 may be replaced with any other desired layer of display pixel circuitry. Encapsulation layer 74-3 may encapsulate and planarize the pixel circuitry in OLED layer 74-2. Touch sensor layer 74-4 may include touch sensor circuitry such as an array of touch sensor electrodes. If desired, the touch sensor circuitry may be disposed or layered on an underlying substrate.

Conductive material in central region 100 of touch sensor layer 74-4, OLED layer 74-2, and/or TFT layer 74-1 may collectively form the antenna resonating element 66 for far field antenna 40F. Antenna currents in a far field frequency band may flow through antenna resonating element 66 and thus through central region 100 of touch sensor layer 74-4, OLED layer 74-2, and/or TFT layer 74-1. Coil 70 of NFC antenna 40N may be disposed on one or more layers (e.g., at one or more interfaces) of display module 98. Coil 70 may be disposed within and/or may overlap peripheral region 84 of display panel 96. Coil 70 does not overlap any ferrite material or ferrite layers in device 10 (e.g., there may be no ferrite layers between coil 70 and the interior of device 10 because display module 98 is free of ferrite material or ferrite layers).

In a first example, coil 70 may be layered onto the interior surface of display cover layer 90 (e.g., at location 102). During manufacture of display 14, coil 70 may be layered onto display cover layer 90 and then display panel 96 may be laminated onto coil 70 and display cover layer 90, for example.

In a second example, coil 70 may be layered onto the upper (outer) surface of touch sensor layer 74-4 (e.g., at location 104). Put differently, coil 70 may be layered, sandwiched, or interposed between polymer layer(s) 92 and touch sensor layer 74-4 (e.g., may be disposed at the interface between polymer layer(s) 92 and touch sensor layer 74-4). During manufacture of display 14, coil 70 may be integrated into display panel 96 (e.g., at location 104) in the semiconductor/panel fabrication process of display panel 96 and then display panel 96 (including coil 70) may be attached to display cover layer 90, for example. In this example, polymer layer(s) 92 may include a planarization layer for coil 70.

In a third example, coil 70 may be layered onto the lower (inner) surface of touch sensor layer 74-4 and/or onto the upper (outer) surface of encapsulation layer 74-3 (e.g., at location 106). Put differently, coil 70 may be layered, sandwiched, or interposed between touch sensor layer 74-4 and encapsulation layer 74-3 (e.g., may be disposed at the interface between touch sensor layer 74-4 and encapsulation layer 74-3). During manufacture of display 14, coil 70 may be integrated into display panel 96 (e.g., at location 106) in the semiconductor/panel fabrication process of display panel 96 and then display panel 96 (including coil 70) may be attached to display cover layer 90, for example.

In a fourth example, coil 70 may be layered onto the upper (outer) surface of OLED layer 74-2 and/or onto the lower (inner) surface of encapsulation layer 74-3 (e.g., at location 108). Put differently, coil 70 may be layered, sandwiched, or interposed between encapsulation layer 74-3 and OLED layer 74-2 (e.g., may be disposed at the interface between encapsulation layer 74-3 and OLED layer 74-2). During manufacture of display 14, coil 70 may be integrated into display panel 96 (e.g., at location 108) in the semiconductor/panel fabrication process of display panel 96 and then display panel 96 (including coil 70) may be attached to display cover layer 90, for example.

In a fifth example, coil 70 may be layered onto the upper (outer) surface of TFT layer 74-1 and/or onto the lower (inner) surface of OLED layer 74-2 (e.g., at location 110). Put differently, coil 70 may be layered, sandwiched, or interposed between TFT layer 74-1 and OLED layer 74-2 (e.g., may be disposed at the interface between TFT layer 74-1 and OLED layer 74-2). During manufacture of display 14, coil 70 may be integrated into display panel 96 (e.g., at location 110) in the semiconductor/panel fabrication process of display panel 96 and then display panel 96 (including coil 70) may be attached to display cover layer 90, for example.

If desired, coil 70 may include one or more windings at two or more of locations 102, 104, 106, 108, and 110 (e.g., coil 70 may be disposed at any desired combination of two or more of locations 102, 104, 106, 108, and 110). In these implementations, conductive vias and/or other vertical conductors may extend through one or more layers of display panel 96 (e.g., parallel to the Z-axis) to couple the conductive segments of coil 70 on different layers of display module 98 together (e.g., while maintaining electrical continuity between each of the windings of the coil).

The example of FIG. 7 is illustrative and non-limiting. If desired, display panel 96 may have additional layers and/or one or more layers of display panel 96 may be omitted. As one example, touch sensor layer 74-4 may be omitted. As another example, OLED layer 74-2 may be omitted. The layers of display panel 96 may be stacked in other orders.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device comprising:

conductive housing sidewalls;

a display cover layer mounted to the conductive housing sidewalls;

a display panel mounted to the display cover layer, wherein the display panel includes a central region and a peripheral region that laterally surrounds the central region, the central region of the display panel emits light through the display cover layer, and the peripheral region of the display panel does not emit light through the display cover layer; and a near field communications (NFC) coil interposed between the display panel and the display cover layer, wherein the NFC coil overlaps the peripheral region of the display panel and laterally surrounds a central area that overlaps the central region of the display panel.

2. The electronic device of claim 1, wherein the NFC coil is layered onto an interior surface of the display cover layer.

3. The electronic device of claim 2, further comprising:

a layer of optically clear adhesive interposed between the NFC coil and the display panel.

4. The electronic device of claim 1, wherein the NFC coil is layered onto a surface of the display panel.

5. The electronic device of claim 4, further comprising:

a planarization layer interposed between the NFC coil and the display cover layer.

6. The electronic device of claim 1, wherein the display panel contains no ferrite layers.

7. The electronic device of claim 1, further comprising:

an opaque masking layer on the display cover layer, wherein the opaque masking layer overlaps the NFC coil and the peripheral region of the display panel.

8. The electronic device of claim 1, wherein the display panel comprises:

a thin film transistor (TFT) layer;

an organic light emitting diode (OLED) layer on the TFT layer;

an encapsulation layer on the OLED layer; and a touch sensor layer on the encapsulation layer.

9. The electronic device of claim 8, further comprising:

a far field antenna having an antenna resonating element configured to convey radio-frequency signals through the display cover layer, wherein the antenna resonating element overlaps the central area of the NFC coil and includes at least some of the TFT layer, at least some of the OLED layer, and at least some of the touch sensor layer.

10. The electronic device of claim 9, further comprising:

a flexible printed circuit coupled to the display panel and overlapping the central region of the display panel, wherein the flexible printed circuit is configured to convey display data to display pixels in the display panel.

11. An electronic device comprising:

conductive housing sidewalls;

a display cover layer mounted to the conductive housing sidewalls;

a display panel mounted to the display cover layer, wherein the display panel includes an organic light emitting diode (OLED) layer configured to display images through the display cover layer; and a coil interposed between the OLED layer and the display cover layer, the coil being configured to convey near field communications (NFC) signals through the display cover layer.

12. The electronic device of claim 11, wherein the display panel includes display pixels, the coil is non-overlapping with respect to the display pixels, and the coil laterally surrounds a central region that overlaps the display pixels.

13. The electronic device of claim 11, further comprising:

a printed circuit board (PCB) coupled to the display panel, the OLED layer being interposed between the display cover layer and the PCB.

14. The electronic device of claim 13, wherein the display panel comprises:

an encapsulation layer interposed between the OLED layer and the display cover layer; and a touch sensor layer interposed between the encapsulation layer and the display cover layer.

15. The electronic device of claim 14, wherein the coil is layered onto a surface of the display cover layer and the electronic device further comprises a layer of optically clear adhesive interposed between the coil and the touch sensor layer.

16. The electronic device of claim 14, wherein the coil is layered onto the touch sensor layer and the electronic device further comprises a planarization layer interposed between the coil and the display cover layer.

17. The electronic device of claim 14, wherein the coil is interposed between the encapsulation layer and the touch sensor layer.

18. The electronic device of claim 14, wherein the coil is interposed between the OLED layer and the encapsulation layer.

19. The electronic device of claim 11, wherein the display panel is free from ferrite overlapping the coil.

20. A wristwatch comprising:

a housing;

a display mounted to the housing, wherein the display includes a touch sensor layer, an organic light emitting diode (OLED) layer configured to emit light within an active area of the display, and a thin film transistor (TFT) layer;

a far field antenna having an antenna resonating element that includes a portion of the touch sensor layer overlapping the active area of the display, a portion of the OLED layer overlapping the active area of the display, and a portion of the TFT layer overlapping the active area of the display; and a near field antenna in the display and overlapping an inactive area of the display, wherein there are no ferrite layers in the display.

* * * * *